Nov. 13, 1945.  D. PARKER  2,388,798
DUSTING APPARATUS
Filed Feb. 21, 1942
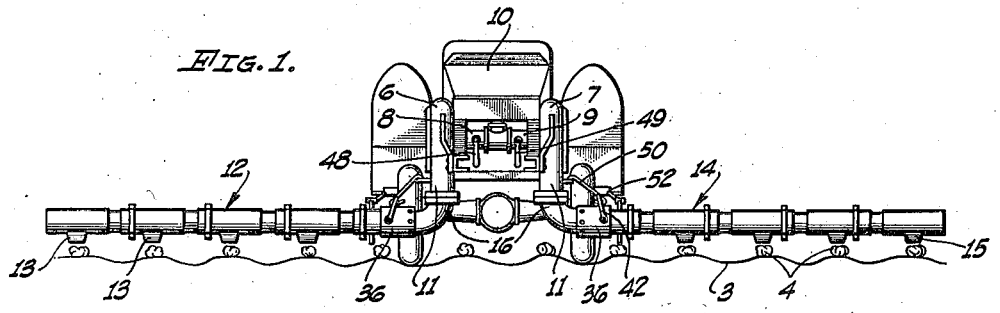
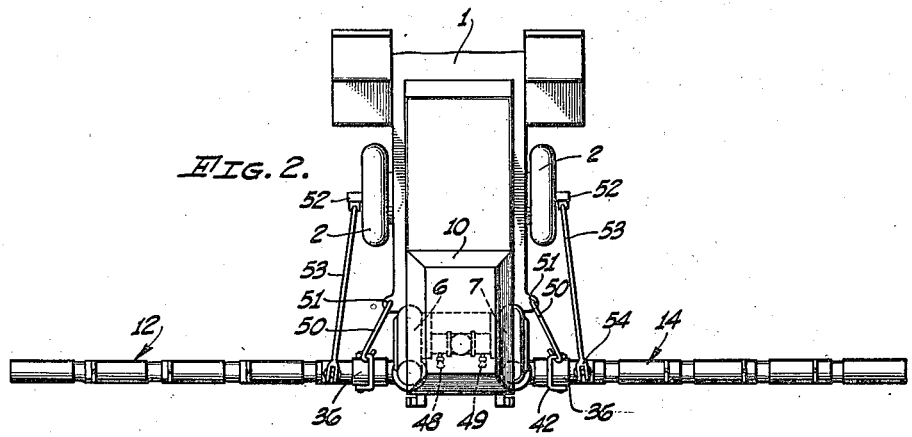
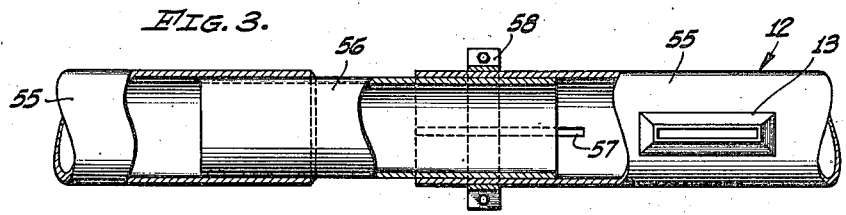
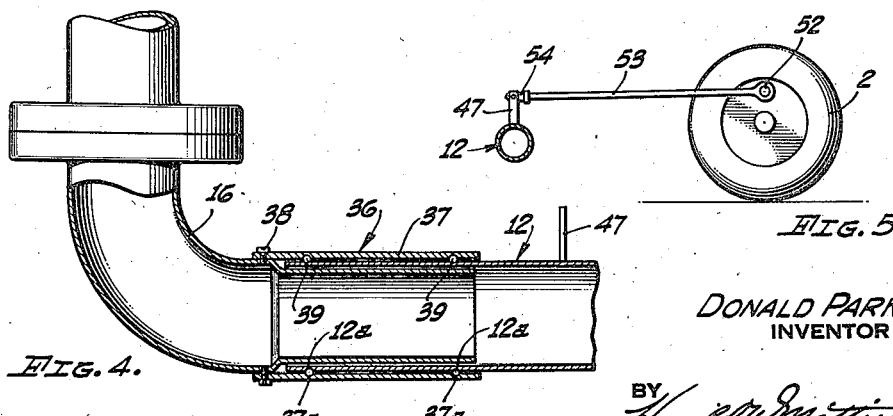
DONALD PARKER,
INVENTOR
BY
ATTORNEY.

UNITED STATES PATENT OFFICE 2,388,798

DUSTING APPARATUS

Donald Parker, Fresno, Calif.

Application February 21, 1942, Serial No. 431,862

4 Claims. (Cl. 43—148)

My invention relates to dust applying machines and has particular reference to an apparatus adapted for the dusting or "dry spraying" of vines, vegetable plants, shrubs and the like with insecticide or fungicide in the form of dry dust.

The practice of dusting trees, vines and plants with powdered insecticides and fungicides has become a well established method of controlling certain insect pests. For example, the dry dusting of citrus trees with sulphur dust for Thrips has become a recognized treatment in this industry while likewise the dusting of insecticides on plants, vegetable crops and the like has been practiced by the use of aeroplane dusters.

In the treatment of citrus trees, and to some extent, deciduous trees with dry dusts, an apparatus has been used comprising generally a carriage device which may be moved along the space between adjacent rows of trees and which carries a dust bin from which the dust may be fed into a blast of air from one or more blowers mounted on the carriage, the air and dust blast being conducted by one or more conduits extending outwardly from the carriage and arranged to be disposed beneath the overhanging branches of the trees.

In my Patent No. 2,226,136, issued December 24, 1940, I have disclosed and claimed an improved dusting device which is particularly adapted for the speedy and economical dusting of trees. Such a device is not, however, particularly well suited for the dusting of low growing plants and shrubs since in the dusting of low growing plants, such as vegetables and vines, adequate pest control can be realized only by covering all parts of the plant with the dust. This obviously requires complete distribution of the dust throughout the leaves and foliage of the plant and requires that the dust be applied also to the undersurface of the leaves and stems. This is a result which is difficult to accomplish with the device constructed particularly with a view to dusting trees.

In my copending application Serial No. 288,628, filed August 5, 1939, issued Sept. 29, 1942, as Patent No. 2,297,110, I have disclosed and claimed an improved nozzle construction for use on dusting devices such as that disclosed in my aforementioned Patent No. 2,226,136. My copending application also discloses an improved conduit structure and mounting therefor which is particularly adapted to the dusting of low growing vegetables and plants. This conduit structure and mounting therefor comprises the subject-matter of the present application which is a continuation-in-part of my aforesaid copending application.

In addition, however, to obtaining a complete distribution of dust through the foliage, a device adapted for dusting vegetables and the like should be capable of simultaneously dusting the vegetables in a considerable number of rows since otherwise a great deal of time would be consumed in the dusting operation, rows of vegetables being spaced many times closer than are the rows of trees in orchards. Furthermore, the spacing between rows of vegetables varies with the size and type of vegetable plant or shrub and the dusting device should therefore be adapted to different row spacings.

It is an object of the present invention to provide an improved nozzle and conduit construction and mounting for use with the carriage illustrated in my patent hereinbefore referred to and which will provide for the dusting of low growing plants such as vegetables, vines and shrubs.

It is also an object of my invention to provide a dusting apparatus of the character set forth in the preceding paragraph which provides for a uniform distribution of dust throughout the foliage of low growing plants and which provides also for the application of dust to the undersurfaces of the leaves, stems and twigs of such low growing plants.

Another object of my invention is to provide a dusting apparatus in which the nozzles are automatically oscillated about a horizontal axis so as to direct blasts of the air and dust in different directions against the surfaces of the leaves to insure the complete contacting and covering of the leaves with dust.

It is additionally an object of my invention to provide a dusting apparatus of the character hereinbefore referred to which includes a conduit carrying a plurality of dust applying nozzles, together with means for adjusting the spacing between the nozzles to conform to the spacing between the rows of plants being dusted.

Other objects and advantages of my invention will be apparent from a study of the following specifications, read in connection with the accompanying drawing, wherein:

Fig. 1 is an elevational view illustrating the appearance of the preferred embodiment of my invention and the manner in which it is employed to simultaneously dust a plurality of rows of vegetable plants;

Fig. 2 is a plan view of the equipment illustrated in Fig. 1;

Fig. 3 is a longitudinal section through a conduit employed with the apparatus illustrated in Figs. 1 and 2 illustrating a construction providing for the adjustment of the spacing of the nozzles;

Fig. 4 is a fragmentary elevational view with parts shown in section to illustrate the details of construction of a bearing permitting the conduit to be oscillated about its horizontal axis; and Fig. 5 is a fragmentary elevational view illustrating the details of construction of a means for automatically oscillating the conduit.

Referring to the drawing, I have illustrated in Figs. 1 and 2 the preferred embodiment of my invention as including a carriage 1 which may be constructed as a modified form of truck or cart employing wheels 2 by means of which the carriage may be moved over the ground surface 3 in which is planted a plurality of rows of vegetable plants 4. The carriage 1 is adapted to support a suitable source of power (not shown) which may comprise an internal combustion engine or other self-contained prime mover.

The power source or engine is drivably coupled with a pair of fans or blowers 6 and 7 which have intakes 8 and 9, respectively, coupled to a dust bin 10 which contains a supply of finely divided sulphur or other insecticide or fungicide which is to be applied to the plants 4. A downwardly extending pipe 11 is connected to the discharge of the blower 6 and connected to a horizontally extending conduit 12 which carries a plurality of downwardly directed nozzles 13 adapted to distribute throughout the foliage of the plants 4 the dust which is delivered thereto by means of the conduits 11 and 12 by the fan or blower 6. Similarly the blower 7 is connected to a horizontally extending conduit 14 which supports a plurality of spaced and downwardly directed nozzles 15, the conduits 12 and 14 being extended laterally away from the carriage 1 in opposite directions.

As illustrated in Figs. 1 and 2, the conduits 12 and 14 are arranged to be carried in a horizontal position immediately above the vegetable plants 4 so that blasts of dust and air projected from the nozzles 13 and 15 may be directed against the plants 4.

The conduits 12 and 14 are connected to the blowers 6 and 7 through elbow connectors 16 so that the downwardly directed discharge of the blowers 6 and 7 may be conveyed into the conduits 12 and 14.

In order to effectively distribute the dust throughout the leaves and foliage of the plants 4, it is necessary that the blasts be directed not only downward against the top of the plant (in which event the plants are spread out and dust is distributed throughout the interior of the plant), but also laterally against the sides of the plant so as to permit the force of the blast to cause the plants to lean to one side and expose the undersurfaces of the leaves and twigs to the blast, thus providing for the dusting of these undersurfaces.

I have accordingly provided for rotation of the conduits 12 and 14 about their own longitudinal axes by providing a rotary joint 36 between the lower ends of the elbows 16 and the conduits 12 and 14 which comprises a short cylindrical outer shell member 37 into which the outer end of the elbow 16 may project and which may be fixed to the elbow 16 by bolts or rivets 38. The free end of the conduit 12 may project into the shell 37 and into telescopic relation with the free end of the elbow 16 as indicated in Fig. 4. To permit relatively free rotation of the conduit 12, the shell 37 may have a pair of grooves 37a formed upon its inner surface near opposite ends of the shell, to be aligned with corresponding grooves 12a formed on the exterior surface of the conduit 12 so that the cooperating grooves 37a and 12a constitute a ball race into which a plurality of metal balls 39 may be placed and which will act to hold the conduit 12 fixed against longitudinal movement relative to the shell 37 but which will permit free rotation between these members.

The conduits 12 and 14 may be automatically oscillated about their longitudinal axes as the carriage 1 advances over the surface of the ground 3 by providing an eccentric pin 52 on each of the carriage wheels 2 to each of which pins may be removably secured a connecting rod 53, the outer end of each of which rods may be detachably connected as by means of a yoke or clevice 54 to a bridle 47 rigidly secured to each of the conduits 12 and 14. Now as the carriage is moved forwardly, the connecting rod will be reciprocated forwardly and rearwardly, causing an automatic oscillation of the conduit 12.

This oscillation will serve to direct the blasts of dust and air first against one side of the plants and against the tops of the plants and then against the other side of the plants. When the blasts are directed against the sides of the plant, the force of the blasts pushes the plants over so as to expose the undersurfaces of the leaves and twigs and by adjusting the height of the conduits 12 and 14 so as to position the nozzles closely adjacent the plants, the force of the blast may be such to drive the blast of dust and air into the interior of the plant. When the blasts are directed downwardly against the top of the plants, the plants are pushed downwardly by the blast of dust and air and are separated laterally so as to expose all of the surfaces of the leaves and foliage comprising the interior of the plant. Thus, by oscillating the conduit about its longitudinal axis as the carriage is advanced along the rows of plants, each plant is subjected to a complete and thorough dusting providing for a complete distribution of the dust throughout the leaves and foliage of the plant and the adequate coating of the undersurfaces of all of the leaves.

The conduits 12 and 14 may be held against swinging movement about the vertical axis of the discharges 11 during advancing movement of the carriage over the surface of the ground by providing a locking brace rod 50 which is extended between a clevice 42 secured to the rotary joint 36 and a suitable socket 51 formed upon or attached to some stationary part of the carriage 1.

The conduits 12 and 14 are preferably of identical construction and include an adjustable joint positioned between each adjacent pair of nozzles 13 or 15. Such a joint may be formed in the manner illustrated in Fig. 3 by forming the conduit of a plurality of separate sections 55 one of each of such sections being employed for each of the nozzles 13 or 15. One of the sections 55 preferably carries a tubular extension 56 adapted to be telescopically received within the end of the next adjacent conduit section 55, this end being split as indicated at 57, whereby inwardly directed clamping forces exerted by a clamping band 58 surrounding the end of such section may place the end of the section into clamping engagement with the tubular extension 56. By loosening the clamping band 58, the conduit sections 55 may be moved toward or away from each other to space the nozzles 13 or 15 as desired to conform to the spacing between the rows of vegetable plants 4. When the nozzles are so positioned they may be locked in such adjusted position by retightening the clamping band 58.

According to the preferred embodiment of my invention each of the conduits 12 and 14 carries a plurality of the nozzles 13 and 15 so that during one passage of the carriage along the surface of the ground in a direction parallel to the length of rows of vegetable plants 4, a plurality of rows of such plants may be dusted. I have found, for example, that by providing four of the nozzles 13 and 15 on each of the conduits 12 and 14, eight rows of plants may be simultaneously treated. It will be noted that as shown in Fig. 1 four rows of plants positioned immediately adjacent the carriage 1 will not receive such treatment. However, upon reaching the end of one passage through the field the carriage may be reversed and a return trip made through the field with one of the sets of nozzles, such as the nozzles 15, so positioned as to treat those plants which were not treated during the first passage of the machine through the field.

Under certain circumstances only one of the conduits 12 or 14 need by employed as when finishing up the treating of a field of vegetables under such circumstances as to require the dusting of four rows or less on the next trip of the carriage across the field. In order to prevent the undue wasting of dust through the nozzles carried by the other conduit I interpose between the dust bin 10 and the inlet of each of the blowers 6 and 7 control valves 48 and 49 which will permit the supply of dust to either of the blowers to be shut off at will. These valves may also be used for controlling the density of the dust blast as the conditions being treated or the types of plants being treated may require.

From the foregoing it will be observed that I have provided a dust applying device which is particularly adapted for the dusting of low growing plants and shrubs such as vegetable plants and vines and that the device of my invention provides for the complete and relatively uniform distribution of dust throughout the leaves and foliage of the plants and the application of the dust to the under sides of such leaves and foliage.

It will also be observed that the device of my invention provides for adjusting the spacing between the various dust applying nozzles to conform to the spacing between the rows of plants being treated.

While I have shown and described the preferred embodiment of my invention. I do not desire to be limited to any of the details of construction shown or described herein, except as defined in the appended claims.

I claim:

1. In a device for applying dust to the under surfaces of the leaves of plants, shrubs and the like, a carriage, means on said carriage for producing a blast of air mixed with dust, a conduit supported by said carriage in a position to extend substantially horizontally outward therefrom and connected to said blast producing means, a nozzle on the outer end of said conduit for directing said blast transversely of the length of said conduit and against said plants, means mounting said conduit on said carriage for oscillation about the longitudinal axis of said conduit, and means for interconnecting said carriage and conduit for automatically oscillating said conduit as said carriage advances over the ground, whereby said blast is directed against both the under and upper surfaces of the leaves of said plants.

2. In a device for applying dust to the under surfaces of the leaves of plants, shrubs and the like, a carriage including wheels adapting said carriage for movement over the ground, means on said carriage for producing a blast of air mixed with dust, a conduit supported by said carriage in a position to extend substantially horizontally outward therefrom and connected to said blast producing means, a nozzle on the outer end of said conduit for directing said blast transversely of the length of said conduit and against said plants, means mounting said conduit on said carriage for oscillation about the longitudinal axis of said conduit, and means interconnecting said carriage and conduit for automatically oscillating said conduit as said carriage moves over the ground including a reciprocating member pivotally connected at one end to said conduit and pivotally connected at the other end to one of said wheels, whereby said blast is directed against both the under and upper surfaces of the leaves of said plants.

3. In a device for applying dust to the under surfaces of the leaves of plants, shrubs and the like, a carriage including wheels adapting said carriage for movement over the ground, means on said carriage for producing a blast of air mixed with dust, a conduit supported by said carriage in a position to extend substantially horizontally outward therefrom and connected to said blast producing means, a nozzle on the outer end of said conduit for directing said blast transversely of the length of said conduit and against said plants, means mounting said conduit on said carriage for oscillation about the longitudinal axis of said conduit, and means interconnecting said carriage and conduit for automatically oscillating said conduit as said carriage moves over the ground including an eccentric on one of said wheels, a lever secured to said conduit, and a connecting rod interconnecting said eccentric and said lever, whereby said blast is directed against both the under and upper surfaces of the leaves of said plants.

4. In a device for applying dust to the under surfaces of the leaves of plants, shrubs and the like, a carriage, means on said carriage for producing a blast of air mixed with dust, a conduit supported by said carriage in a position to extend substantially horizontally outward therefrom and connected to said blast producing means, a plurality of nozzles spaced along the length of said conduit for directing said blast transversely of the length of said conduit and against said plants, means mounting said conduit on said carriage for oscillation about the longitudinal axis of said conduit, and means interconnecting said carriage and conduit for automatically oscillating said conduit as said carriage advances over the ground, whereby said blast is directed against both the under and upper surfaces of the leaves of said plants.

DONALD PARKER.